(12) United States Patent
Leone

(10) Patent No.: US 8,783,231 B2
(45) Date of Patent: Jul. 22, 2014

(54) VENTURI FOR VAPOR PURGE

(75) Inventor: Thomas G. Leone, Ypsilanti, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 241 days.

(21) Appl. No.: 13/418,198

(22) Filed: Mar. 12, 2012

(65) Prior Publication Data

US 2013/0233287 A1  Sep. 12, 2013

(51) Int. Cl.
*F02M 33/04* (2006.01)
*F02M 25/08* (2006.01)
*F02D 41/00* (2006.01)
*F02M 33/00* (2006.01)

(52) U.S. Cl.
CPC .......... *F02M 25/0872* (2013.01); *F02M 25/08* (2013.01); *F02D 41/003* (2013.01); *F02D 41/0032* (2013.01); *F02D 41/0045* (2013.01)
USPC .......................................... 123/520; 123/336

(58) Field of Classification Search
CPC . F02D 41/003; F02D 41/0032; F02D 41/005; F02M 33/02; F02M 25/0872
USPC ................. 123/520, 516, 518, 519, 336, 442, 123/339.23; 701/103
See application file for complete search history.

(56) References Cited

U.S. PATENT DOCUMENTS

| 4,164,914 | A | * | 8/1979 | Hattori et al. .............. 123/700 |
| 4,168,686 | A | | 9/1979 | Wakita et al. |
| 4,932,386 | A | | 6/1990 | Uozumi et al. |
| 5,080,078 | A | | 1/1992 | Hamburg |
| 2005/0016505 | A1 | | 1/2005 | Everingham et al. |
| 2007/0113833 | A1 | | 5/2007 | Balsdon |
| 2007/0295303 | A1 | * | 12/2007 | Hirooka .................. 123/339.23 |
| 2008/0015769 | A1 | * | 1/2008 | Hirooka ..................... 701/101 |
| 2011/0120432 | A1 | | 5/2011 | Ulrey et al. |
| 2011/0146631 | A1 | * | 6/2011 | Konohara et al. ............. 123/520 |
| 2012/0016566 | A1 | * | 1/2012 | Cunningham et al. ........ 701/103 |
| 2012/0237368 | A1 | * | 9/2012 | Pursifull et al. ............... 417/55 |

* cited by examiner

*Primary Examiner* — Mahmoud Gimie
(74) *Attorney, Agent, or Firm* — Julia Voutyras; Alleman Hall McCoy Russell & Tuttle LLP

(57) ABSTRACT

Systems and methods for an engine comprising a venturi coupled in an intake of the engine are provided. In one example approach, a method of controlling operation of an engine having a fuel vapor purging system comprises: directing intake air through a first throttle and a venturi disposed in a bypass conduit coupled around an intake of the engine upstream and downstream of a second throttle disposed in the intake; and in response to an operating condition, delivering fuel vapor flow from the fuel vapor purging system to an inlet of the venturi.

18 Claims, 10 Drawing Sheets

VENTURI FOR VAPOR PURGE

BACKGROUND/SUMMARY

Evaporative emissions control systems capture fuel vapors in a charcoal canister, e.g., when a vehicle is parked, then burn the vapors in the engine when it is running. In some approaches a vacuum generated in the engine's intake manifold is used to pull air through the charcoal canister in order to purge the fuel therein. In some examples, such fuel vapor purging systems may be employed in engines which include features to increase fuel economy, e.g., via variable camshaft timing, variable valve lift, engine downsizing, e.g. EcoBoost, hybridization, e.g., in a hybrid electric vehicle (HEV), etc.

However, such approaches which increase fuel economy may reduce an amount of vacuum in the intake manifold, and/or how often vacuum is available, thus reducing an amount of vacuum available to purge fuel vapors from a fuel vapor purge system. Further, in some examples, if more purge vacuum is desired in such approaches, fuel economy may be sacrificed in order to increase vacuum for fuel purging, e.g. by forcing an engine re-start on an HEV or by reducing use of variable camshaft timing or variable valve lift. Some approaches may employ electric pumps for vapor purge in order to avoid this fuel economy penalty. However, such pumps may be expensive, and the electricity to power them may increase parasitic loads which degrade fuel economy.

In some approaches, a venturi or aspirator may be coupled in an intake system of the engine and a fuel vapor purge system, or other systems which require vacuum, may be coupled to an inlet of the venturi so that vacuum generated in the venturi may be provided to the fuel vapor purge system, or other vacuum system. However, the inventors have recognized issues with such approaches. For example, a venturi coupled in an intake system of an engine may restrict flow so that wide-open throttle performance may be degraded. Further, in such approaches, the position of the venturi relative to a throttle may degrade engine performance. For example, if a venturi is disposed in an intake system downstream of a throttle, the air volume downstream of the throttle may be increased, which may lead to a degraded transient torque response, especially in turbocharged engines. As another example, if a venturi is disposed in an intake system upstream of a throttle, an increase in throttle body deposits may occur in the throttle when a fuel vapor purging system is coupled to an inlet of the venturi.

In order to at least partially address these issues, systems and methods for an operating engine comprising a venturi coupled in an intake system of the engine are provided. In one example approach, a method of controlling operation of an engine having a fuel vapor purging system comprises: directing intake air through a first throttle and a venturi disposed in a bypass conduit coupled to an intake system of the engine upstream and downstream of a second throttle disposed in the intake system; and in response to an operating condition, delivering fuel vapor flow from the fuel vapor purging system to an inlet of the venturi.

In this way, the venturi or aspirator in the intake manifold may be employed to increase an amount and availability of vacuum for fuel vapor purging which may reduce component costs and increase fuel economy while providing sufficient vacuum to the vapor purging system while reducing impact on wide open throttle performance, for example.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
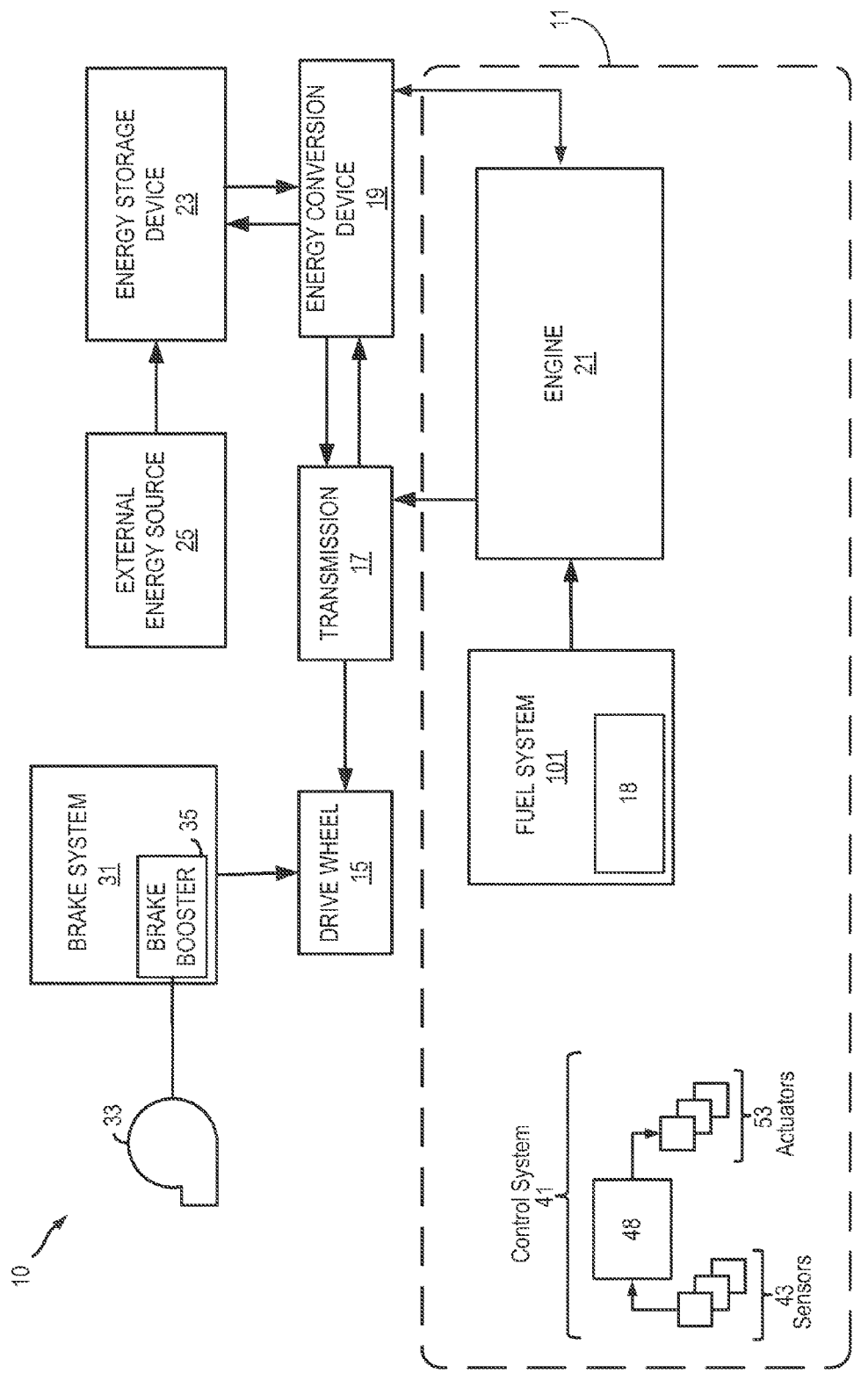
FIG. 1 shows a schematic depiction of an example vehicle with an engine system.
Figure 2:
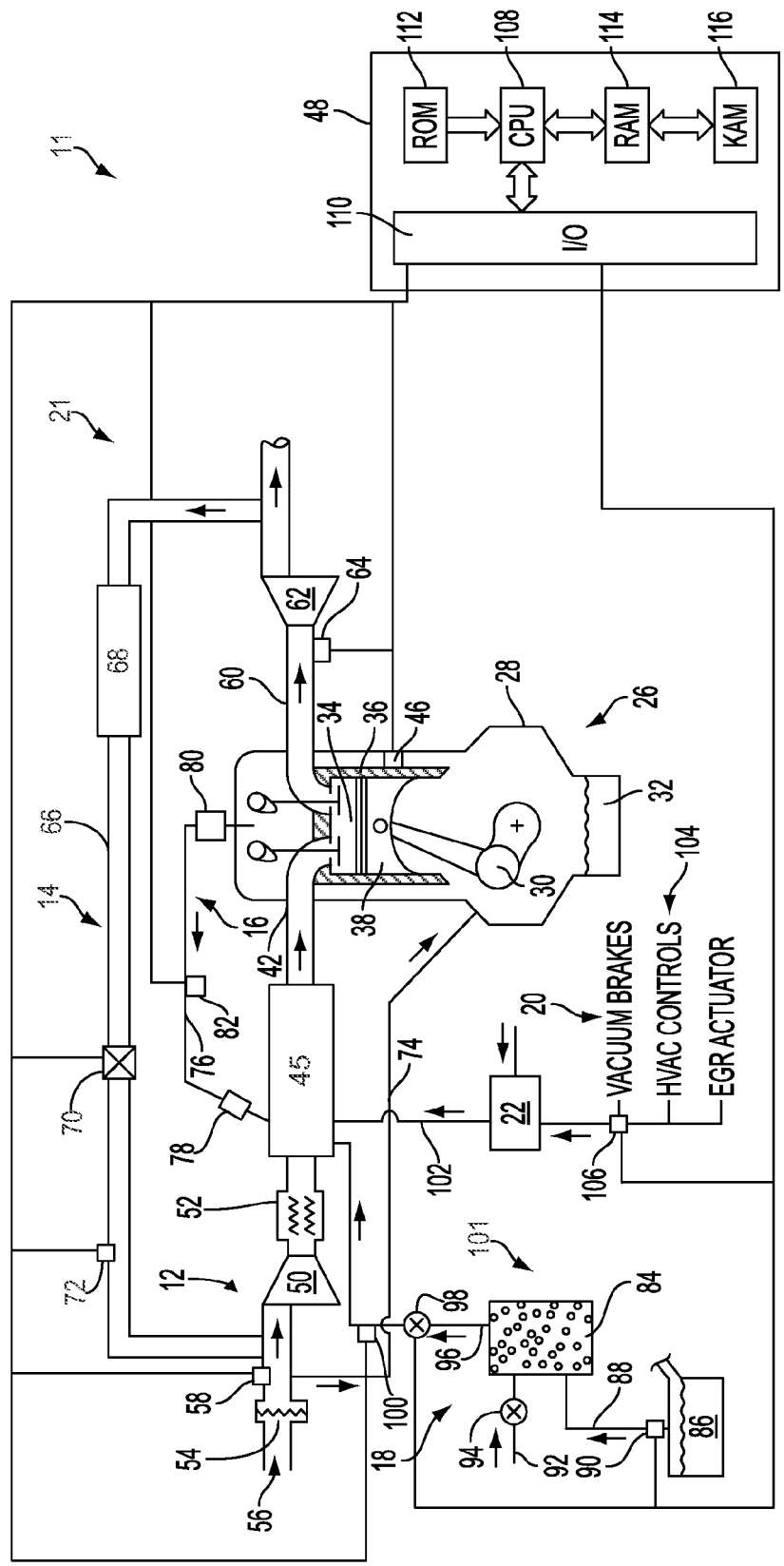
FIG. 2 shows an example engine system.
Figure 3:
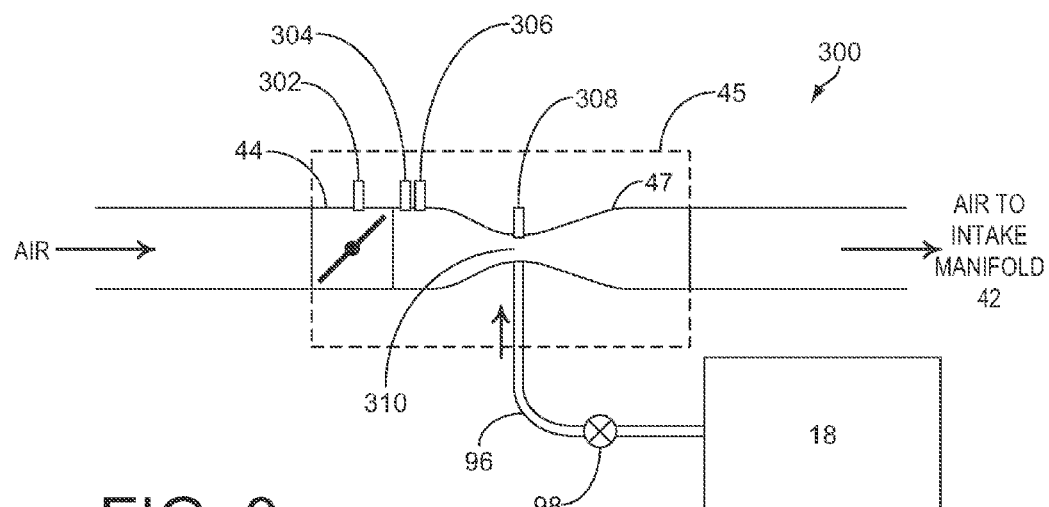
FIGS. 3-5 show example embodiments of a venturi coupled in an intake system of the engine in accordance with the disclosure.
Figure 4:
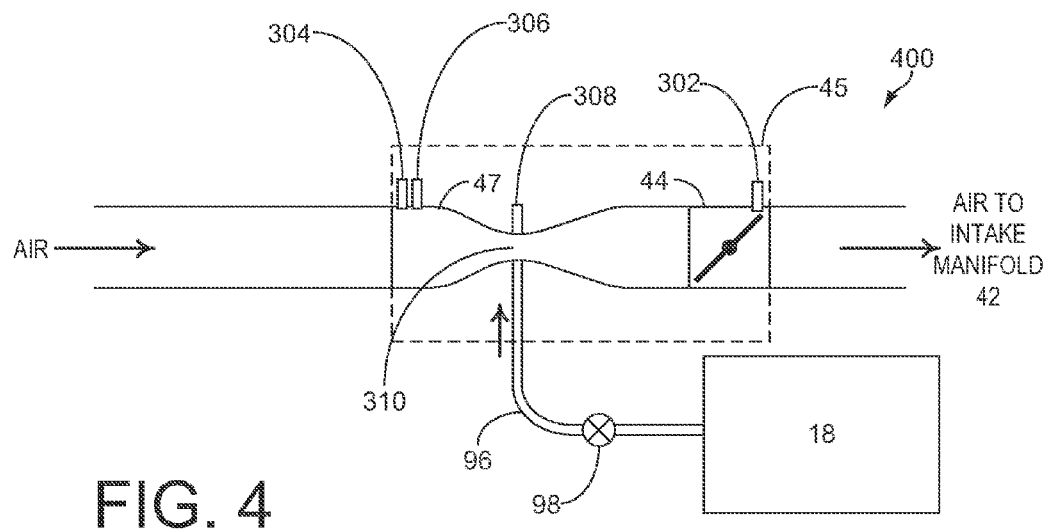
Figure 5:
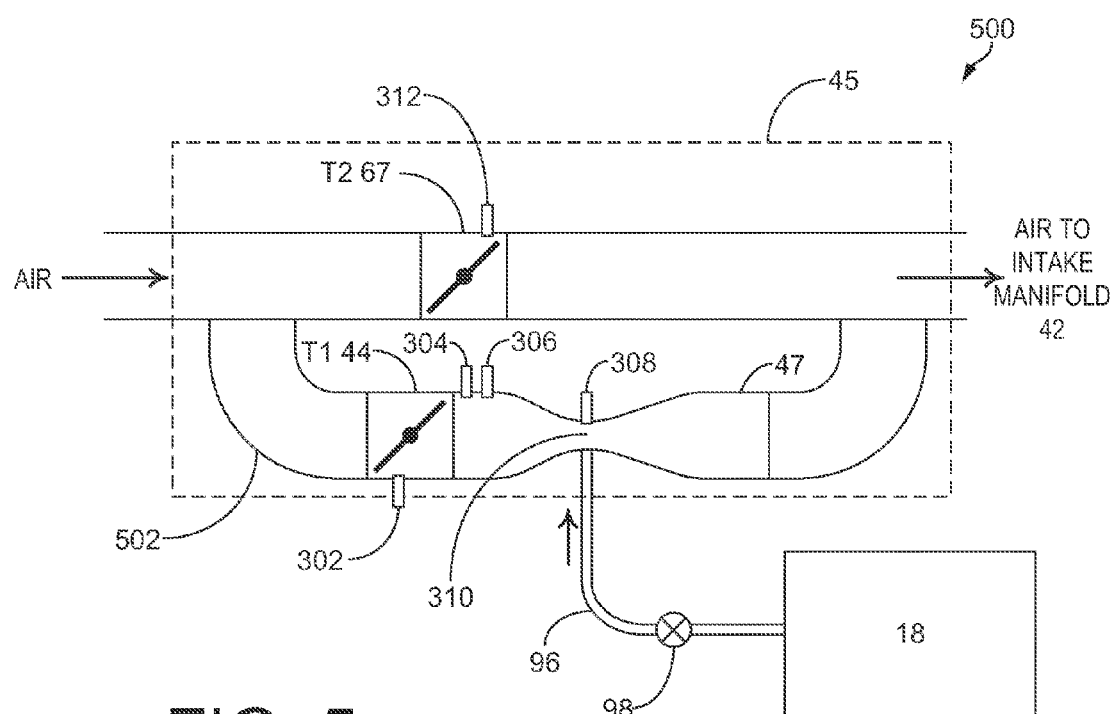

The following description relates to systems and methods for operating an engine with a fuel vapor purging system, such as the systems shown in FIGS. 1-2. As shown in FIGS. 3-5, a venturi or aspirator may be disposed in an intake system of the engine adjacent to a throttle, and a fuel vapor purging system may be coupled to the venturi so that a vacuum generated by the venturi may be used during fuel purging events. A shown in FIGS. 6-7, various methods may be used to purge fuel from the fuel vapor purging system utilizing the vacuum generated by the venturi. Further, throttle adjustments, for example as shown FIGS. 8-11, may be performed in response to engine operating conditions to meet torque demands while still providing vacuum to a fuel vapor purging system.

Turning now to FIG. 1, an example vehicle with an engine is schematically shown. In some examples, as shown in FIG. 1, the vehicle may be a hybrid electric vehicle (HEV) and may include a hybrid propulsion system 10. However, in other examples, the vehicle may not be an HEV and may be propelled solely by an engine system 11.

Hybrid propulsion system 10 includes an internal combustion engine 21 coupled to transmission 17. Transmission 17 may be a manual transmission, automatic transmission, or combinations thereof. Further, various additional components may be included, such as a torque converter, and/or other gears such as a final drive unit, etc. Transmission 17 is shown coupled to drive wheel 15, which may contact a road surface.

In this example embodiment, the hybrid propulsion system also includes an energy conversion device 19, which may include a motor, a generator, among others and combinations thereof. The energy conversion device 19 is further shown coupled to an energy storage device 23, which may include a battery, a capacitor, a flywheel, a pressure vessel, etc. The energy conversion device may be operated to absorb energy from vehicle motion and/or the engine and convert the absorbed energy to an energy form suitable for storage by the energy storage device (in other words, provide a generator operation). The energy conversion device may also be operated to supply an output (power, work, torque, speed, etc.) to the drive wheel 15 and/or engine 21 (in other words, provide a motor operation). It should be appreciated that the energy conversion device may, in some embodiments, include a motor, a generator, or both a motor and generator, among various other components used for providing the appropriate conversion of energy between the energy storage device and the vehicle drive wheels and/or engine.

The depicted connections between engine 21, energy conversion device 19, transmission 17, and drive wheel 15 may indicate transmission of mechanical energy from one component to another, whereas the connections between the energy conversion device 19 and the energy storage device 23 may indicate transmission of a variety of energy forms such as electrical, mechanical, pneumatic, hydraulic, etc. For example, torque may be transmitted from engine 21 to drive the vehicle drive wheel 15 via transmission 17. As described above energy storage device 23 may be configured to operate in a generator mode and/or a motor mode. In a generator mode, system 10 may absorb some or all of the output from engine 21 and/or transmission 17, which may reduce the amount of drive output delivered to the drive wheel 15, or the amount of braking torque from brake system 31, which includes brake booster 35 including a brake booster pump, to the drive wheel 15. Such operations may be employed, for example, to achieve efficiency gains through regenerative braking, increased engine efficiency, etc. Further, the output received by the energy conversion device may be used to charge energy storage device 23. Alternatively, energy storage device 23 may receive charging energy from an external energy source 25, such as a plug-in to a main electrical supply, or a hydraulic or pneumatic pressure source. In motor mode, the energy conversion device may supply mechanical output to engine 21 and/or transmission 17, for example by using electrical energy stored in an electric battery, or hydraulic energy stored in an accumulator.

Hybrid propulsion embodiments may include full hybrid systems, in which the vehicle can run on just the engine, just the energy conversion device (e.g. motor), or a combination of both. Assist or mild hybrid configurations may also be employed, in which the engine is the primary torque source, with the hybrid propulsion system acting to selectively deliver added torque, for example during tip-in or other conditions. Further still, starter/generator and/or smart alternator systems may also be used.

The various components described above with reference to FIG. 1 may be controlled by a vehicle control system 41, which includes a controller 48 with computer readable instructions for carrying out routines and subroutines for regulating vehicle systems, a plurality of sensors 43, and a plurality of actuators 53. Select examples of the plurality of sensors 43 and the plurality of actuators 53 are described in further detail below, in the description of fuel system 101.

Turning now to FIG. 2, an example system configuration of a multi-cylinder engine, generally depicted at 11, which may be included in a propulsion system of an automobile, such as the vehicle shown in FIG. 1, is shown.

The engine may include a plurality of vacuum-utilizing devices or systems coupled to the engine intake system 12, such as an exhaust gas recirculation (EGR) system 14, a crankcase ventilation system 16, a fuel vapor purge system 18, a brake booster 20, and/or a vacuum amplifier 22. For example, the vacuum amplifier may be of the design shown in U.S. Pat. No. 5,291,916. In some examples, one or more of the vacuum-utilizing devices may be coupled to a venturi disposed in intake system 12 within a throttle and venturi system 45 described below. For example, fuel vapor purge system 18 may be coupled to the venturi so that a vacuum generated by the venturi may be used to purge fuel from the fuel vapor purge system during select engine operating conditions.

Engine system 11 may include a lower portion of the engine block, indicated generally at 26, which may include a crankcase 28 encasing a crankshaft 30 with oil sump 32 positioned below the crankshaft. The upper portion of engine block 26 may include a combustion chamber (i.e., cylinder) 34. The combustion chamber 34 may include combustion chamber walls 36 with piston 38 positioned therein. Piston 38 may be coupled to crankshaft 30 so that reciprocating motion of the piston is translated into rotational motion of the crankshaft. Combustion chamber 34 may receive fuel from fuel injectors (not shown) and intake air from intake manifold 42 which is positioned downstream of throttle 44 within a throttle and venturi system 45 described below. The engine block 26 may also include an engine coolant temperature (ECT) sensor 46 input into an engine controller 48 (described in more detail below herein).

A throttle and venturi system 45 (described in more detail below herein) includes a throttle which controls the airflow entering intake manifold 42 and may be preceded upstream by compressor 50 followed by charge air cooler 52. In some examples, compressor 50 may be equipped with a compressor bypass valve. An air filter 54 may be positioned upstream of throttle and venturi system 45 and may filter air entering intake passage 56. A mass air flow (MAF) sensor 58 may be disposed in intake system 12 and may be connected to controller 48.

Exhaust combustion gases exit the combustion chamber 34 via exhaust passage 60 located upstream of turbine 62. An exhaust gas sensor 64 may be disposed along exhaust passage 60 upstream of turbine 62. Turbine 62 may be equipped with a wastegate bypassing it. In some examples, the wastegate may be vacuum actuated. Sensor 64 may be a suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Exhaust gas sensor 64 may be connected with controller 48.

Exhaust gas traveling within EGR conduit 66 may be cooled as it passes through EGR cooler 68 which may be located within the EGR conduit 66 and upstream of an adjustable exhaust gas recirculation valve 70 followed by an EGR pressure sensor 72 which may be connected to controller 48. The adjustable EGR valve 70 controls the flow rate of exhaust gases traveling in the EGR conduit 66. The EGR valve 70 may be a vacuum actuated valve. While this example shows exhaust gas being drawn from downstream of the turbine and delivered upstream of the compressor (low pressure EGR), it may also be drawn from upstream of the turbine and delivered downstream of the compressor (high pressure EGR), or combinations thereof, if desired. In another example, the position of EGR valve 70 may be monitored and controlled by controller 48.

As noted above, various vacuum-utilizing devices or systems may be coupled to a venturi disposed in intake system 12 within a throttle and venturi system 45 described below. Note, however, that in some examples, one or more vacuum-utilizing devices may also be coupled to the engine intake manifold 42, such as positive crankcase ventilation, for example.

In the example of FIG. 2, a positive crankcase ventilation system 16 is coupled to a venturi in throttle and venturi system 45. The crankcase ventilation system 16 vents air out of the crankcase 28 via conduit 76 which may include a one-way PCV valve 78 to provide continual evacuation of gases from inside the crankcase 28.

The PCV conduit 76 may include a uni-directional oil separator 80 which filters oil from vapors exiting crankcase 28 before they re-enter the intake system 12. The PCV conduit 76 may also include a vacuum sensor coupled to the PCV system. In the example of FIG. 2, a vacuum sensor 82 is disposed along conduit 76 between oil-separator 80 and PCV valve 78. Vacuum sensor 82 may be connected to controller 48.

As shown in FIG. 2, a venturi included in throttle and venturi system 45 may be coupled with the fuel vapor purge system, depicted generally at 18. The fuel vapor purge system 18 includes a fuel vapor canister 84 which receives fuel vapors from fuel tank 86 via conduit 88. A fuel tank pressure sensor 90 may be disposed along fuel conduit 88 and connected to controller 48. An air intake conduit 92 containing air intake valve 94 joined to the fuel vapor canister 84 allows air to be drawn into the fuel vapor canister 84. The flow of intake air into the fuel vapor canister 84 is controlled by air intake valve 94. A fuel vapor purging conduit 96 is joined to the fuel vapor canister 84 and may be coupled with the venturi in the throttle and venturi system 45 so that the venturi may generate a vacuum that aids in drawing vapor out of the fuel vapor canister 84 via conduit 96, which may contain a fuel vapor purging valve 98 allowing for flow control in the fuel vapor purge system. The position of the FVP valve 98 may be monitored and controlled by controller 48. As shown in the example of FIG. 2, a fuel vapor purge pressure sensor 100 may be disposed within purge conduit 96. FVP sensor 100 may be connected to controller 48.

In some examples, a venturi in throttle and venturi system 45 may be coupled with the brake booster 20. In one example, the brake booster 20 may be preceded by a vacuum amplifier 22. In the embodiment shown in FIG. 2, throttle and venturi system 45 is coupled downstream with vacuum amplifier 22 via conduit 102, supplying a vacuum for the vacuum amplifier 22 which feeds vacuum-powered actuators, depicted generally at 104 (e.g., vacuum brakes, HVAC controls, and EGR actuation (such as valve 70). As shown in the example of FIG. 2, the brake booster 20 may include a vacuum sensor 106 which may be connected to controller 48. When coupled with the brake booster or vacuum amplifier for vacuum-powered actuators, the venturi supplies a vacuum source even when manifold pressure is boosted above atmospheric pressure, thus lowering the energy threshold of the brake booster or vacuum amplifier. However, as remarked above, in other examples, the brake booster may instead be coupled to the engine intake.

Controller 48 is shown in FIG. 2 as a microcomputer, including microprocessor unit 108, input/output ports 110, an electronic storage medium for executable programs and calibration values shown as read only memory chip 112 in this particular example, random access memory 114, keep alive memory 116, and a data bus. Controller 48 may receive various signals from sensors coupled to engine system 11, including measurement of inducted mass air flow (MAF) from mass air flow sensor 58; engine coolant temperature (ECT) from temperature sensor 46; PCV pressure from vacuum sensor 82; EGR pressure from vacuum sensor 72; exhaust gas air/fuel ratio from exhaust gas sensor 64; brake booster vacuum from vacuum sensor 106; fuel tank pressure from pressure sensor 90; and/or fuel vapor purge pressure from vacuum sensor 100. Storage medium read-only memory 112 can be programmed with computer readable data representing instructions executable by processor 108 for performing the methods described below, as well as other variants that are anticipated but not specifically listed.

FIGS. 3-5 show example embodiments of throttle and venturi system 45. Throttle and venturi system 45 includes a venturi coupled in an intake system of the engine and a throttle disposed in the intake system adjacent to the venturi. Further, a fuel vapor purge system is coupled to the venturi so that vacuum generated by the venturi in the intake system may be used to assist fuel vapor purging.

Turning to FIG. 3, an example embodiment 300 of throttle and venturi system 45 is shown. In this example, a throttle 44 is disposed in intake system 12 upstream of a venturi 47 and fuel vapor purge system 18 is coupled to venturi 47 via a purge conduit 96. Purge conduit 96 is coupled to venturi 47 near a narrow portion or throat 310 of venturi 47 so that vacuum generated by the venturi when air flows through the venturi is accessible to the vapor purge system for purging events. Further, purge conduit 96 includes a purge valve 98 disposed therein which may be actuated in response to fuel vapor purge conditions, as described below.

Further, a variety of sensors may be optionally disposed in throttle and venturi system 45. For example, in some examples, a purge vacuum sensor 308 may be disposed in throat 310 of venturi 47 (or optionally in purge conduit 96) to estimate an amount of vacuum generated by the venturi so that purge valve 98 may be adjusted accordingly during fuel purge events, as described below with regard to FIG. 6. In other examples, throttle and venturi system 45 may not include a purge vacuum sensor and a vacuum generated by venturi 47 may be estimated based on an air flow rate through the venturi, e.g., as measured by mass air flow sensor 58, an air temperature, e.g., as measured by a temperature sensor 306 disposed upstream of or in an intake of venturi 47, and an air pressure, e.g., as measured by a pressure sensor 304 disposed upstream of or in an intake of venturi 47.

Further, throttle 44 may include a throttle position sensor 302 coupled to a controller, e.g., controller 48, so that a current throttle position may be determined and the throttle adjusted in response to operating conditions as described below with regard to FIG. 7.

In embodiment 300 shown in FIG. 3, which includes a large venturi or aspirator downstream of the throttle, engine air flows through the venturi during engine operation so that vacuum may be available for vapor purge during the engine operation, even near wide-open throttle conditions. In this example, because the venturi is downstream of the throttle, vacuum would be increased at part load. Advantages of this configuration include increased vacuum availability and reduced cost. However, with this configuration, wide-open throttle performance may be slightly degraded because there may be a pressure drop across the venturi which cannot be recovered. Additionally, this configuration may lead to an increased air volume downstream of the throttle, which may degrade transient torque response in turbocharged engine applications.

Turning to FIG. 4, another example embodiment 400 of throttle and venturi system 45 is shown. In this example, a throttle 44 is disposed in intake system 12 downstream of a venturi 47 and fuel vapor purge system 18 is coupled to venturi 47 via a purge conduit 96. Purge conduit 96 is coupled to venturi 47 near a throat 310 of venturi 47 so that vacuum generated by the venturi when air flows through the venturi is accessible to the vapor purge system for purging events.

The embodiment 400 shown in FIG. 4 is similar to embodiment 300 shown in FIG. 3 described above, except that the venturi is upstream of the throttle instead of downstream. In embodiment 400, vacuum may not be increased at part load (but some vacuum may always be available). Further, in this configuration increased throttle body deposits or sticking may occur since fuel vapors go through the throttle during purging events. Like embodiment 300, embodiment 400 may have slightly degraded wide-open throttle performance; however wide open throttle performance in embodiment 400 may be increased since there may be more package space and design freedom to minimize a pressure drop across the venturi. Embodiment 400 may provide increased vacuum availability, reduced cost, and may have little or no impact on transient torque response in turbocharged engine applications.

Turning to FIG. 5, another example embodiment 500 of throttle and venturi system 45 is shown. In this example, a throttle 44 (series throttle) and venturi 47 are disposed in series in a bypass conduit 502 coupled to the intake system 12 upstream and downstream of a second throttle 67 (parallel throttle) disposed in the intake. Here, second throttle 67 is in parallel with venturi 47. Fuel vapor purge system 18 is coupled to venturi 47 via a purge conduit 96. Purge conduit 96 is coupled to venturi 47 near a throat 310 of venturi 47 so that vacuum generated by the venturi when air flows through the venturi is accessible to the vapor purge system for purging events.

The example shown in FIG. 5 shows throttle 44 disposed in bypass conduit 502 upstream of venturi 47; however, in other examples, throttle 44 may be disposed in bypass conduit 502 downstream of venturi 47. Further, second throttle 67 may include a throttle position sensor 312 coupled to a controller, e.g., controller 48, so that a current throttle position of second throttle 67 may be determined and the second throttle adjusted in response to operating conditions as described below with regard to FIG. 7.

Embodiment 500 shown in FIG. 5 includes a venturi in parallel with one throttle (parallel throttle 67) and in series with another throttle (series throttle 44). In this configuration, at most part load conditions, the parallel throttle 67 would be substantially closed and substantially all air would flow through the venture, and the series throttle 44 would be used to control engine torque at part load. When maximum engine torque or power is requested, the parallel throttle 67 would be opened to avoid the pressure drop across the venturi. Though this configuration may have increased costs associated with including two throttles, an increased vacuum availability would be achieved and impact on wide open throttle performance may be reduced.

As remarked above, in some examples various other vacuum-utilizing devices or systems may be coupled to venturi 47 shown in FIGS. 3-5 in addition to or instead of fuel vapor purging system 18 so that the vacuum generated by the venturi may be available to other vacuum-utilizing devices.

Control logic for embodiments 300 and 400 described above may be implemented with fairly conventional purge control strategy. The main difference would be that purge vacuum is not equal to intake manifold vacuum and purge flow rate depends on purge vacuum. Thus, a sensor, e.g., sensor 308, could be used to measure purge vacuum at the throat 310 of the venture or in purge conduit 96. However, in some examples, in order to avoid the cost of a sensor, the purge vacuum may be inferred based on the venturi dimensions, airflow through the venturi, and air density (pressure and temperature) at the venturi. This could be implemented as an equation from first principles, or based on mapping data for an actual venturi, for example. In embodiment 300, the venturi is downstream of the throttle so manifold pressure and temperature could be used in the calculation. In embodiment 400, the venturi is upstream of the throttle so air inlet temperature and pressure (barometric pressure) could be used in the calculation.

Figure 6:
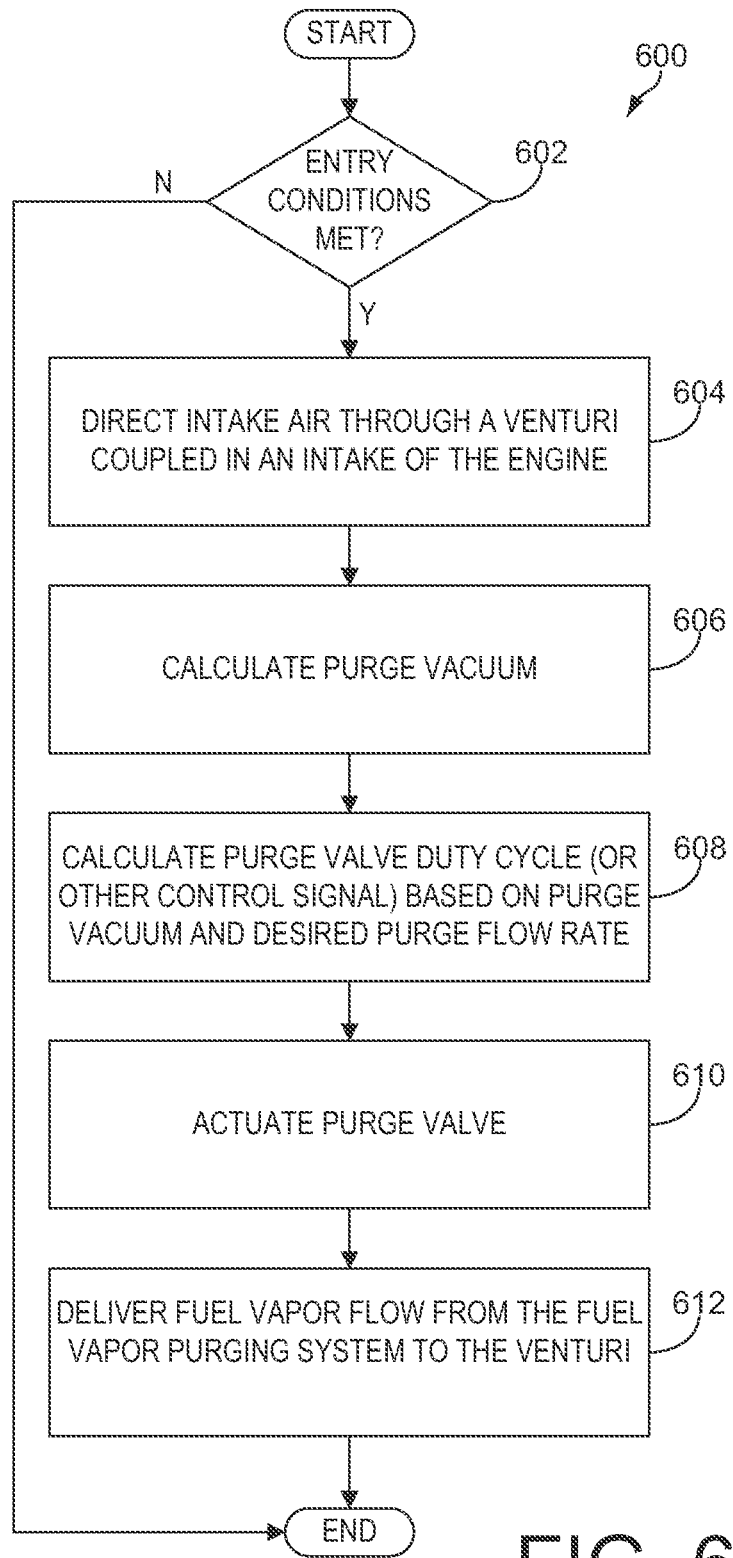
FIGS. 6-7 show example methods of controlling operation of an engine having a fuel vapor purging system in accordance with the disclosure.

FIG. 6 shows example method 600 of controlling operation of an engine having a fuel vapor purging system, e.g., fuel vapor purging system 18, and a throttle and venturi system, such as throttle and venturi system 45 described above.

At 602, method 600 includes determining if entry conditions are met. For example, it may be determined whether a vehicle is on or off, that is, whether or not the vehicle is operational. In one example, this may be detected by a key command sensor and/or motion sensor for a vehicle to determine whether the vehicle is in an engine-on mode or an engine-off mode. Further, purging conditions may include detection of engine-on operations, a signal indicating that the canister loading with fuel vapor is above a predetermined threshold, and/or a signal indicating that the fuel tank pressure is above a threshold.

If entry conditions are met at 602, method 600 proceeds to 604. At 604, method 600 includes directing intake air through a venturi coupled in an intake of the engine. For example, air may be directed through throttle 44 and venturi 47 so that a vacuum is generated and available for fuel vapor purging.

In order to adjust an amount of fuel vapor flow delivered to the venturi via a fuel vapor purging valve coupled to the fuel vapor purging system, at 606, method 600 includes calculating a purge vacuum. For example, as described above, a purge vacuum generated by venturi 47 may be based on an air flow rate through the venturi and an air pressure and air temperature. As another example, the purge vacuum may be determined based on a sensor reading from a vacuum sensor in the throat of the venture or in vapor conduit 96, e.g., sensor 308.

At 608, method 600 includes calculating a purge valve duty cycle, or other control signal, based on the purge vacuum determined at 606 and a desired purge flow rate. For example, controller 48 may adjust purge valve 98 to achieve the desired purge flow rate.

At 610, method 600 includes actuating the purge valve 98 and at 612, method 600 includes delivering fuel vapor flow from the fuel vapor purging system to the venturi to purge fuel vapor from the fuel vapor purge system.

Since embodiment 500 described above includes two separate throttles, the control logic for operating embodiment 500 may be more complicated. In particular, at most part load conditions the parallel throttle 67 may be substantially closed so that substantially all air would flow through the venturi. The series throttle 44 may then be used to control engine torque at part load. When maximum engine torque or power is required, the parallel throttle 67 may be opened to avoid the pressure drop across the venturi.

Figure 7:
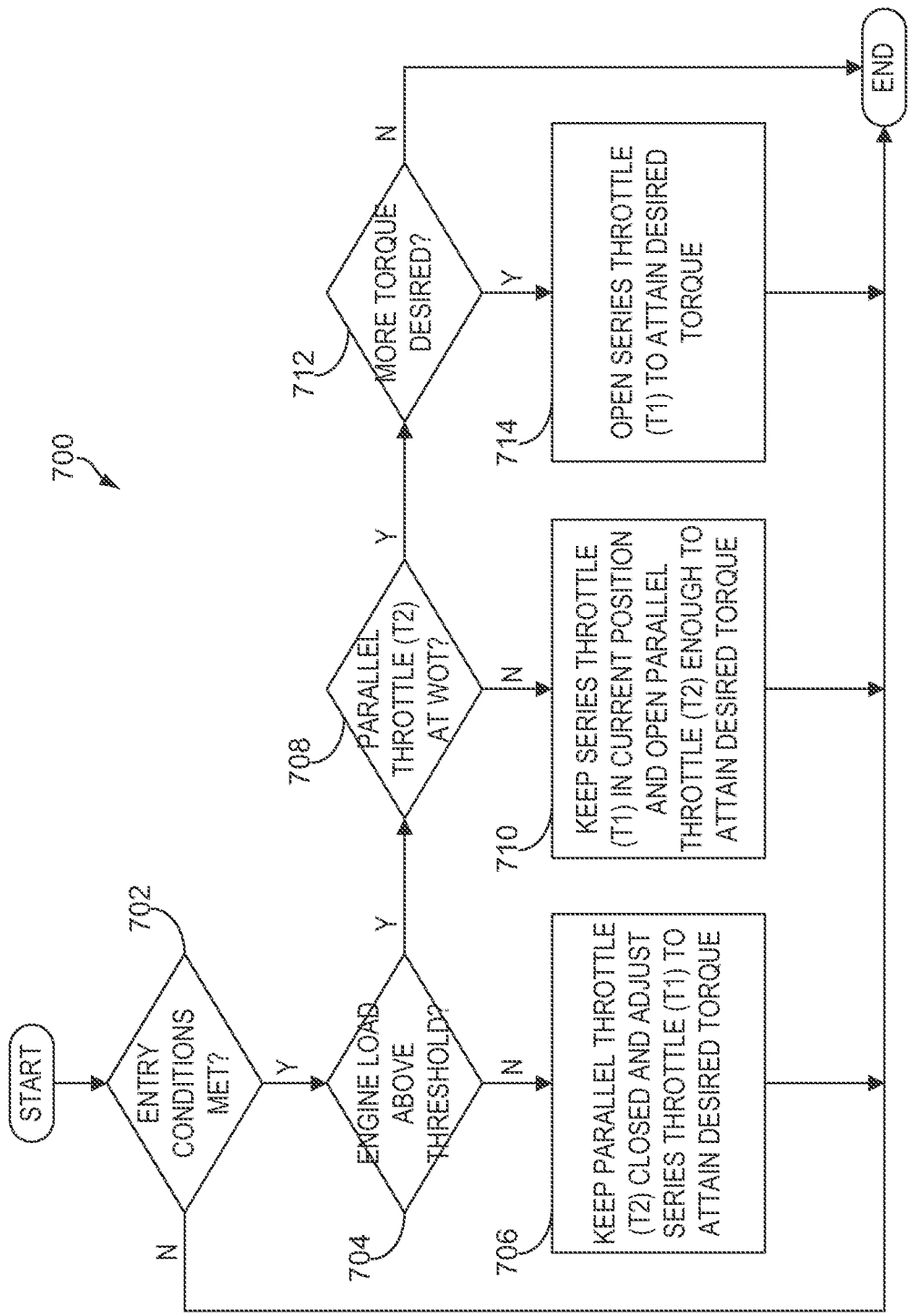

In particular, FIG. 7 shows an example method 600 of controlling operation of an engine having a fuel vapor purging system coupled to embodiment 500 of throttle and venturi system 45 wherein a first throttle and the venturi are disposed in a bypass conduit coupled to the intake system upstream and downstream of a second throttle disposed in the intake system.

At 702, method 700 includes determining if entry conditions are met. For example, it may be determined whether the vehicle is on or off, that is, whether or not the vehicle is operational. In one example, this may be detected by a key command sensor and/or motion sensor for a vehicle to determine whether the vehicle is in an engine-on mode or an engine-off mode. Further, purging conditions may include detection of engine-on operations, a signal indicating that the canister loading with fuel vapor is above a predetermined threshold, and/or a signal indicating that the fuel tank pressure is above a threshold.

If entry conditions are met at 702, method 700 proceeds to 704. At 704, method 700 includes determining if an engine load is above a threshold value. For example, the threshold value may be based on how much airflow can be provided to the engine by adjusting series throttle 44 while keeping parallel throttle 67 substantially closed. The threshold may be based on airflow, intake manifold pressure, estimated engine torque, pressure difference across series throttle 44, or some combination thereof.

If the engine load is not above the threshold value at 704, method 700 proceeds to 706. At 706, method 700 includes keeping the parallel throttle substantially closed and adjusting the series throttle to attain a desired torque. For example, controller 48 may be configured to keep parallel throttle 67 substantially closed and adjust a position of series throttle 44 until a desired torque or a torque demand is met.

If the engine load is above the threshold at 704, method 700 proceeds to 708. At 708, method 700 includes determining if the parallel throttle 67 is in a substantially wide open throttle (WOT) position.

If the parallel throttle 67 is not in a WOT position at 708, method 700 proceeds to 710. At 710, method 700 includes keeping the series throttle in a current position and opening the parallel throttle to attain a desired torque. For example, controller 48 may be configured to maintain series throttle 44 in a current position while adjusting parallel throttle 67 to achieve a desired or requested torque.

However, if the parallel throttle is in a WOT position at 708, method 700 proceeds to 712. At 712, method 700 includes determining if additional torque is desired. For example, when the parallel throttle 67 is in a WOT state, parallel throttle 67 may not be able to be adjusted to achieve any additional torque demands. Thus, if more torque is desired at 712, method 700 proceeds to 714.

At 714, method 700 includes opening the series throttle to meet the additional torque demands. For example, controller 48 may be configured to maintain parallel throttle 67 in a WOT state and adjust series throttle 44 to meet the additional torque demands.

Figure 8:
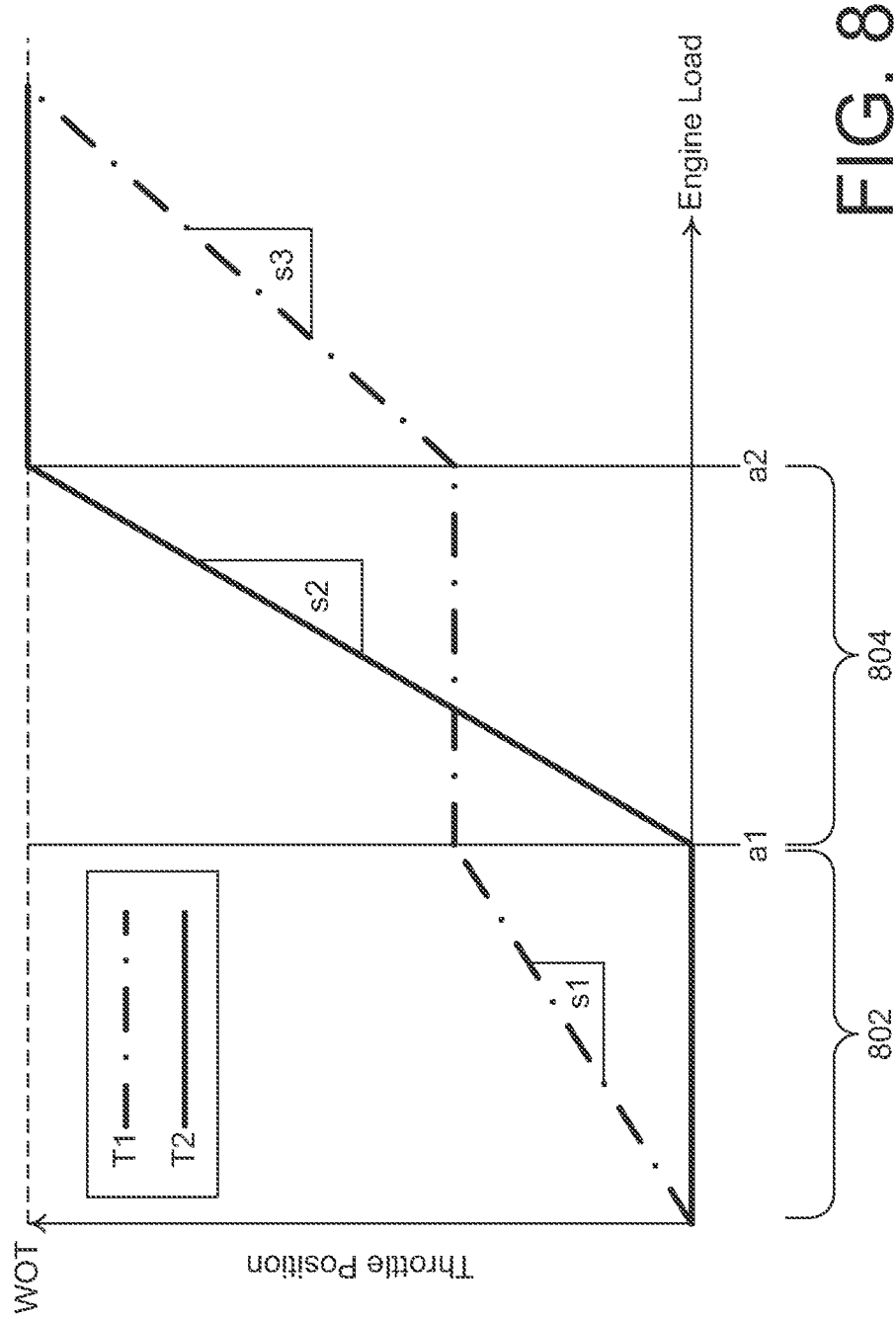
FIG. 8 graphically shows example throttle adjustments in response to engine load changes in accordance with the disclosure.

FIG. 8 graphically shows example throttle adjustments in response to engine load changes at a given engine speed for embodiment 500 shown in FIG. 5 as described above with regard to FIG. 7.

In particular, FIG. 8 shows throttle position adjustments for throttle 44 (T1) shown as a dash-dotted line and throttle 67 (T2) shown as a solid line during three example engine operating conditions.

The first example engine operating condition, shown at 802, is when an engine load is less than a threshold value a1. During this condition, the first throttle T1 is adjusted at a rate s1 to meet a torque demand as requested by a driver via an accelerator pedal, for example, while the second throttle T2 is maintained in a substantially closed position. It should be understood that though the rates of throttle position changes shown in FIG. 8 are linear, in some examples the rates may be non-linear. Further, these throttle position rates of change may depend on the RPM of an engine. For example, at an increased RPM, the throttle position rates of change may increase. Further, an amount of throttle position changes may depend on a size or area of the throttle plates in the first and second throttles. For example, throttle T2 may have a throttle plate with a larger area than the throttle plate in throttle T1.

During a second engine operating condition, shown at 804, the engine load is larger than the threshold value a1 and less than a second threshold value a2. For example, engine load values less than threshold value a1 may be part-load conditions whereas engine load values greater than a1 may be high-load conditions. Engine load values above second threshold a2 may be additional torque requests beyond what throttle T1 can accommodate with throttle T1 in a fixed position, for example.

During second engine operating condition 804, throttle T1 is maintained opened at a current position, which may depend on an engine RPM or other engine parameters, while throttle T2 is adjusted at a rate s2 to accommodate a desired torque. For example, throttle T1 may be maintained at a throttle position corresponding to engine load a1 and throttle T2 may be opened to meet torque demands beyond engine load a1.

At a2, throttle T2 reaches a wide open throttle (WOT) state or at 100% throttle angle, thus any additional torque demands beyond a2 may be met by adjusting throttle T1 at a rate s3.

In this way, during part-load conditions, throttle T1 is maintained partially open and adjusted to meet torque demands so that air flows through venturi 47 to generate a vacuum for use by fuel vapor purging system 18, and the amount of vacuum is increased by the pressure drop across partially open throttle T1. During high-load conditions throttle T1 is still maintained in a fixed partially open state so that air still flows through venturi 47 to generate a vacuum for use by fuel vapor purging system 18, and the amount of vacuum is increased by the pressure drop across partially open throttle T1, while throttle T2 is adjusted to meet the high-load torque demands. Finally, at very high load conditions throttle T1 must be opened further to meet the desired engine torque, despite the decrease in available vacuum from pressure drop across throttle T1.

Figure 9:
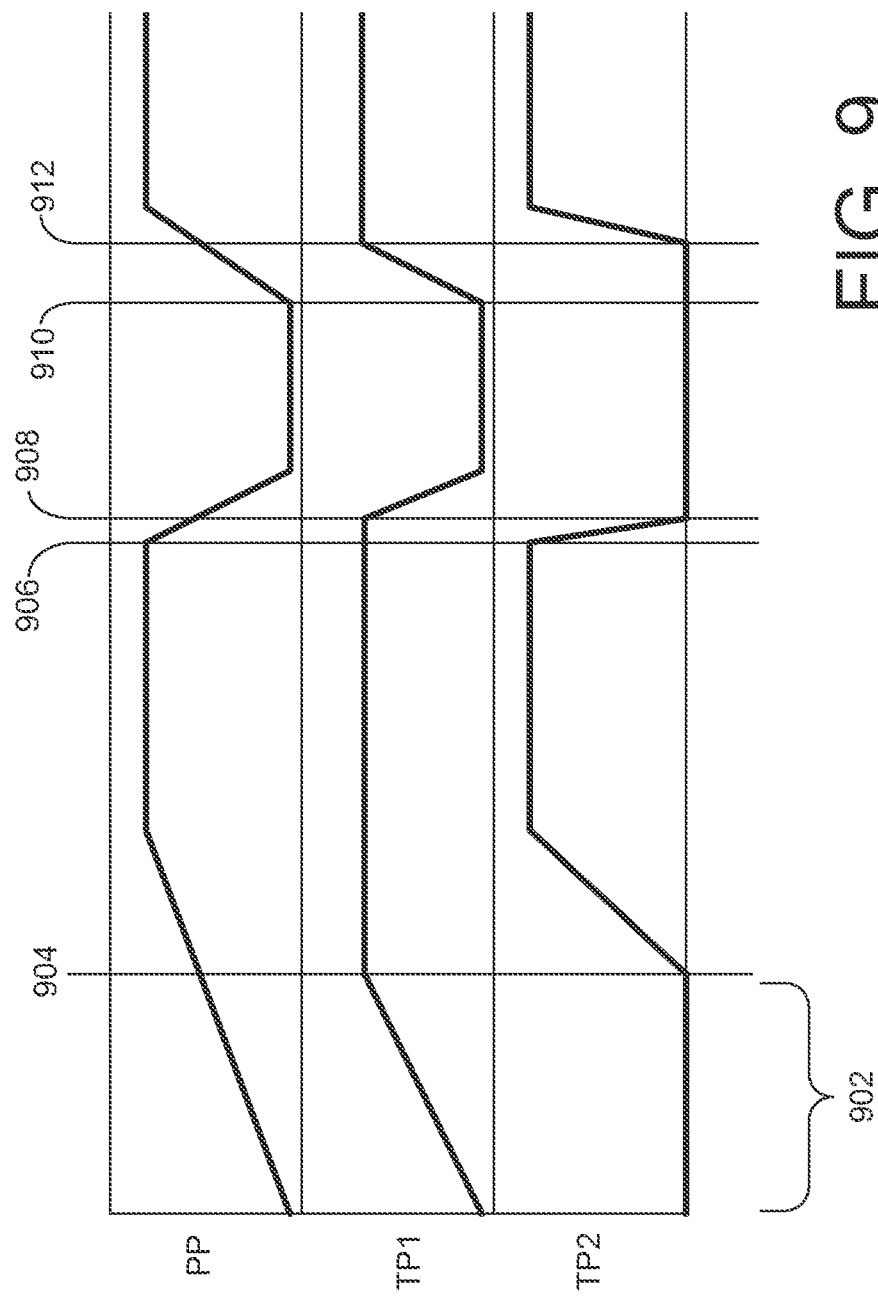
FIG. 9 shows example throttle adjustments in response to pedal position changes in accordance with the disclosure.

FIG. 9 shows example throttle adjustments in response to pedal position changes, e.g., via a driver operating an accelerator pedal coupled to engine 11, for embodiment 500 shown in FIG. 5. In particular, FIG. 9 shows example throttle position (TP1) adjustments to throttle 44 (T1) and throttle position (TP2) adjustments to throttle 67 (T2) in response to pedal position (PP) changes and engine load changes.

For example, in the region 902, pedal position (PP) increases until an engine load threshold is reached at 904. In region 902, throttle T1 is opened by an amount to increase air flow to the engine to meet the torque request generated by the increase in pedal position. In this region, throttle T2 is maintained substantially closed until the engine load reaches a threshold value at 904 (e.g., until the engine load reaches a1 shown in FIG. 8).

Once the engine load reaches the threshold value at 904, throttle T1 is maintained at a current position and throttle T2 is opened by an amount to meet the torque demands generated by the increasing pedal position after 904.

During a tip-out condition at 906, when the engine load is above the threshold value, throttle T1 is maintained in its current state and throttle T2 is closed until the engine load is below the threshold value at 908 at which point throttle T1 is adjusted by an amount so as to reduce air flow to the engine during the tip-out condition. In some examples, throttle T1 is maintained in an open position following a tip-out so as to allow air to continue to flow through venturi 47 so that a vacuum continues to be generated for use during fuel purging events. However, in other examples, throttle T1 may also be closed following a tip-out, e.g., depending on an engine RPM and whether the vehicle is in trailer tow mode, for example.

During a tip-in condition at 910, when the engine load is below the threshold value, throttle T2 is maintained substantially closed while throttle T1 is adjusted by an amount to meet the torque demands generated by the increase in pedal position. When the engine load reaches the threshold value at 912, throttle T1 is maintained at its current open position and throttle T2 is adjusted by an amount to meet the torque demands generated by the pedal position increase during high engine loads.

In this way, transient engine operating conditions may be met while still permitting air to flow through the venturi with a pressure drop across throttle T1, to maximize the amount of vacuum available to vacuum utilizing systems, such as a fuel vapor purging system, coupled in an inlet of the venturi.

Figure 10:
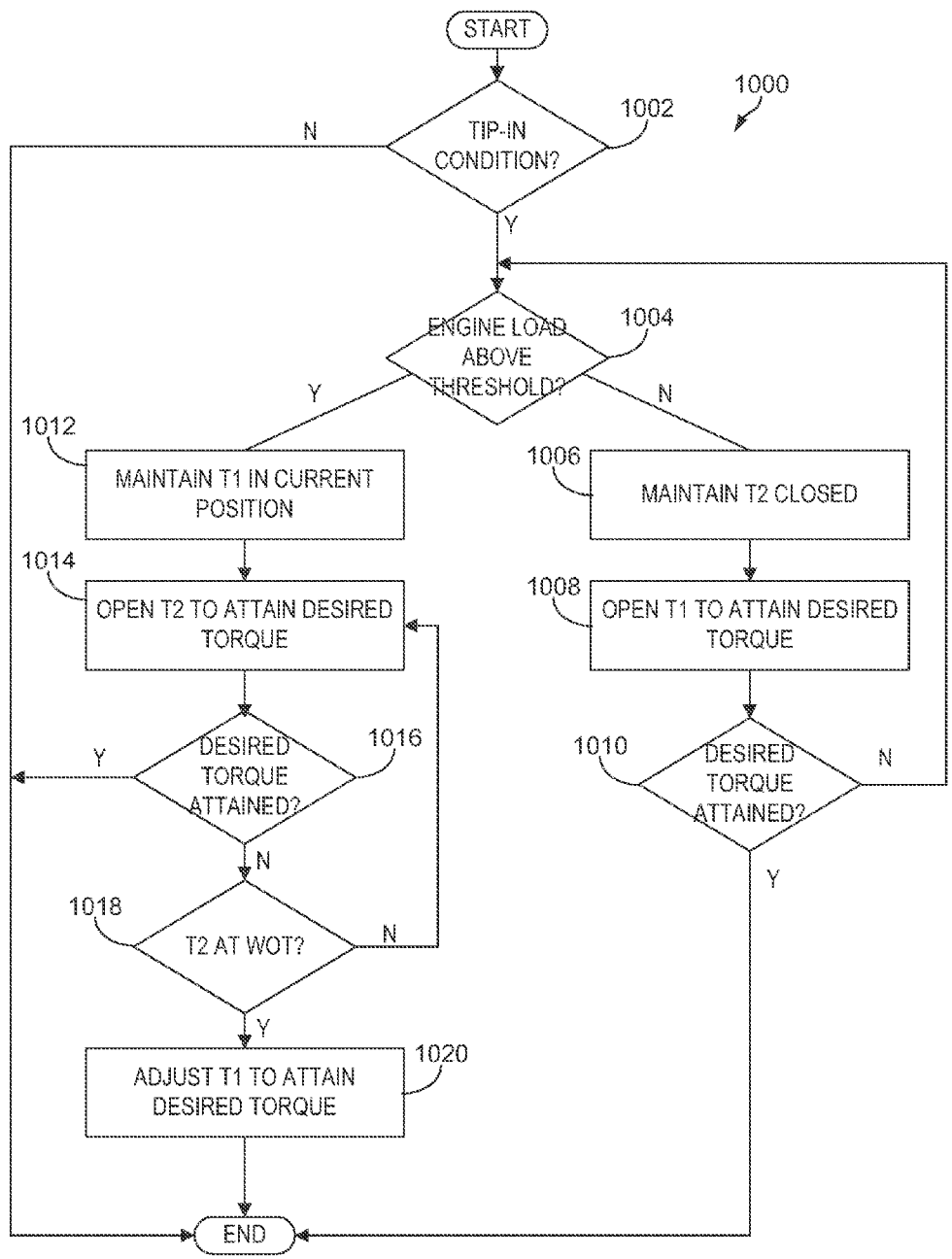
FIGS. 10 and 11 show example methods for adjusting throttles during transient conditions in accordance with the disclosure.

FIG. 10 shows an example method 1000 for adjusting throttle 44 (T1) and throttle 67 (T2) in embodiment 500 in response to a tip-in condition. At 1002, method 1000 includes determining if a tip-in condition occurs. For example, a tip-in condition may occur in response to a change in a driver-operated accelerator pedal position where a driver requests an increase in engine torque and/or engine speed. If a tip-in condition occurs at 1002, method 1000 proceeds to 1004.

At 1004, method 1000 includes determining if an engine load is above a threshold value. As remarked above, the threshold value may be a predetermined engine load threshold where engine loads less than the threshold are part load conditions and engine loads above the threshold value are high load conditions.

If the engine load is below the threshold value at 1004, method 1000 proceeds to 1006. At 1006, method 1000 includes maintaining throttle T2 in a substantially closed state so that substantially all air flows through throttle T1 and venturi 47. At 1008, method 1000 includes opening throttle T1 by an amount to attain a desired torque demanded by the pedal position. If the desired torque is attained at 1010, method 1000 ends. However, if the desired torque is not attained by the adjustment to throttle T1 at 1010 and the engine load remains below the threshold, then throttle T1 may be further opened to attain the desired torque. However, when the engine load rises above the threshold value at 1004, then method 1000 proceeds to 1012.

At 1012, method 1000 includes maintaining throttle T1 in a current position. For example, throttle T1 may be maintained open by an amount that it was opened to achieve the threshold engine load. At 1014, method 1000 includes opening throttle T2 to achieve the desired torque during the high load condition. If the desired torque is attained at 1016, method 1000 ends. However, if the desired torque is not attained at 1016 then throttle T2 may be furthered opened to attain the desired torque until throttle T2 reaches a wide open throttle (WOT) state at 1018. If throttle T2 is in a WOT state and the desired torque had not been attained then, at 1020, method 1000 includes opening throttle T1 further from its current position to attain the desired torque.

Figure 11:
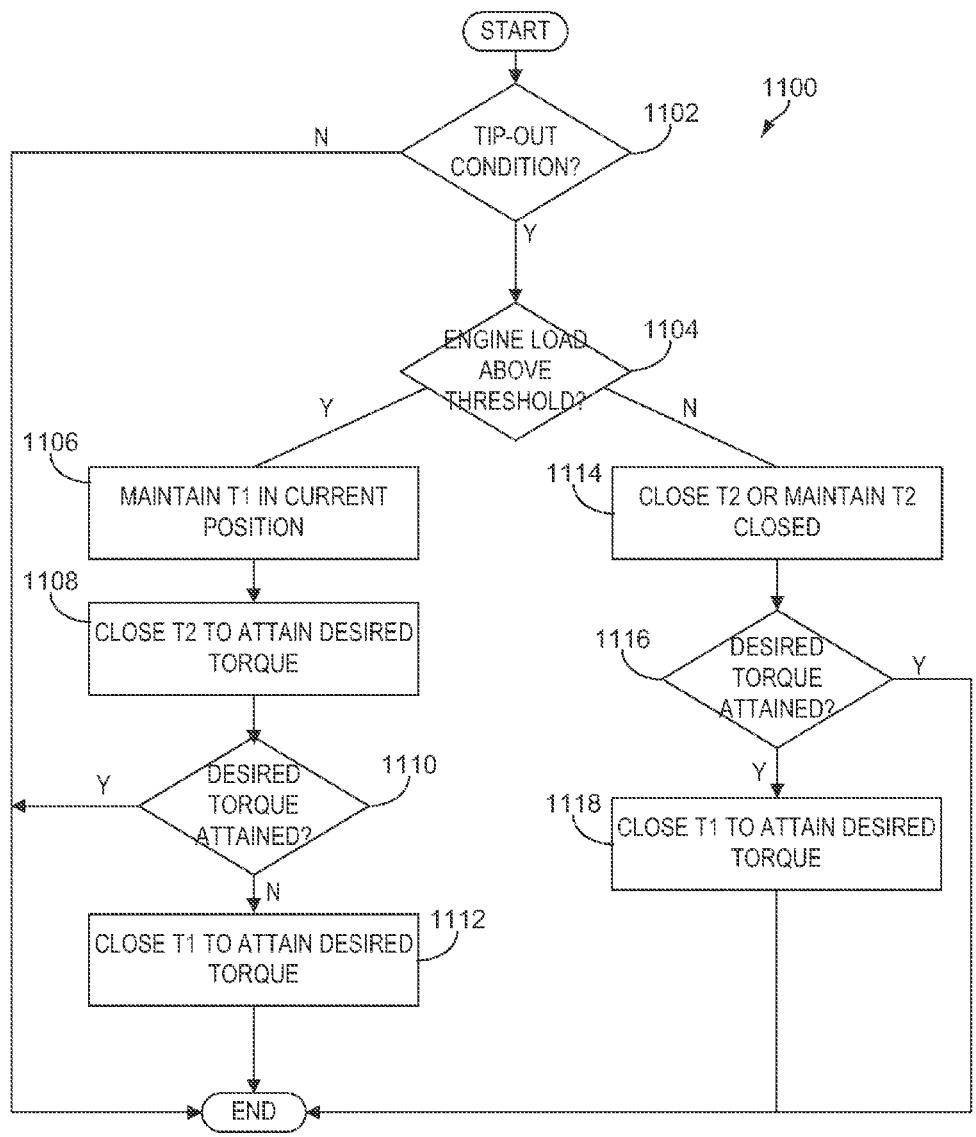

FIG. 11 shows an example method 1100 for adjusting throttle 44 (T1) and throttle 67 (T2) in embodiment 500 in response to a tip-out condition. At 1102, method 1100 includes determining if a tip-out condition occurs. For example, a tip-out condition may occur in response to a change in a driver-operated accelerator pedal position where a driver requests a decrease in engine torque and/or engine speed. If a tip-out condition occurs at 1102, method 1100 proceeds to 1104.

At 1104, method 1100 includes determining if an engine load is above a threshold value. If the engine load is above the threshold value at 1104, method 1100 proceeds to 1106. At 1106, method 1100 includes maintaining throttle T1 in its current position. At 1108, method 1100 includes closing throttle T2 by an amount to attain the desired reduced torque requested by a driver via an accelerator pedal, for example.

At 1110, if the desired torque is attained then method 1100 ends. However, if the desired torque is not attained at 1110 and throttle T2 is fully closed then, at 1112, method 1100 includes closing throttle T1 from its current position to attain the desired reduced torque.

However, if, at 1104, the engine load is below the threshold value, then method 1100 proceeds to 1114. At 1114, method 1100 includes closing throttle T2, if it was open, or maintaining throttle T2 substantially closed. If the desired reduced torque is attained at 1116, method 1100 ends. However, if the desired torque is not attained at 1116 with throttle T2 fully closed, then, at 1118, method 1100 includes closing throttle T1 from its current position to attain the desired reduced torque.

Note that the example control and estimation routines included herein can be used with various system configurations. The specific routines described herein may represent one or more of any number of processing strategies such as event-driven, interrupt-driven, multi-tasking, multi-threading, and the like. As such, various actions, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, functions, or operations may be repeatedly performed depending on the particular strategy being used. Further, the described operations, functions, and/or acts may graphically represent code to be programmed into computer readable storage medium in the control system.

Further still, it should be understood that the systems and methods described herein are exemplary in nature, and that these specific embodiments or examples are not to be considered in a limiting sense, because numerous variations are contemplated. Accordingly, the present disclosure includes all novel and non-obvious combinations of the various systems and methods disclosed herein, as well as any and all equivalents thereof.

The invention claimed is:

1. A method of controlling operation of an engine having a fuel vapor purging system, comprising:
    directing intake air through a first throttle and a venturi disposed in a bypass conduit coupled in parallel around a second throttle disposed in the intake;
    in response to an operating condition, delivering fuel vapor flow from the fuel vapor purging system to an inlet of the venturi; and
    adjusting an amount of fuel vapor flow delivered to the inlet of the venturi via a fuel vapor purging valve coupled to the fuel vapor purging system based on an air flow rate through the venturi and an air temperature and pressure.

2. The method of claim 1, wherein the venturi is coupled to the bypass conduit downstream of the first throttle.

3. The method of claim 1, wherein the venturi is coupled to the bypass conduit upstream of the first throttle.

4. The method of claim 1, further comprising, in response to an engine load less than a threshold, adjusting the first throttle to attain a desired torque while keeping the second throttle substantially closed.

5. The method of claim 1, further comprising, in response to an engine load greater than a threshold when the second throttle is not in a wide open throttle state, adjusting the second throttle to attain a desired torque while keeping the first throttle substantially fixed in a partially open state.

6. The method of claim 1, further comprising, in response to an engine load greater than a threshold when the second throttle is in a substantially wide open throttle state, adjusting the first throttle to attain a desired torque while keeping the second throttle in the wide open state.

7. The method of claim 1, wherein the engine is part of a hybrid electric powertrain.

8. A method of controlling operation of an engine having a fuel vapor purging system, comprising:
  directing intake air through a first throttle and a venturi disposed in a bypass conduit coupled in parallel around a second throttle disposed in the intake;
  in response to an engine load less than a threshold, adjusting the first throttle to attain a desired torque while keeping the second throttle substantially closed and in response to the engine load greater than the threshold when the second throttle is not in a wide open throttle state, adjusting the second throttle to attain the desired torque while keeping the first throttle fixed in a partially open state; and
  in response to a fuel vapor purging condition, delivering fuel vapor flow from the fuel vapor purging system to an inlet of the venturi.

9. The method of claim 8, further comprising adjusting an amount of fuel vapor flow delivered to the inlet of the venturi via a fuel vapor purging valve coupled to the fuel vapor purging system, wherein the amount of fuel vapor flow delivered to the inlet of the venturi is adjusted based on an air flow rate through the venturi and an air temperature and pressure.

10. The method of claim 8, wherein the venturi is coupled in the bypass conduit upstream of the first throttle.

11. The method of claim 8, further comprising, in response to the engine load greater than the threshold when the second throttle is in a substantially wide open throttle state, adjusting the first throttle to attain the desired torque while keeping the second throttle in the wide open state.

12. An engine system comprising:
  a first throttle and a venturi disposed in a bypass conduit coupled in parallel around a second throttle disposed in an intake;
  a fuel vapor purge system coupled to a venturi inlet; and
  a controller with instructions executable to adjust the first throttle in response to a first operating condition; and to adjust the second throttle in response to a second operating condition while fixing the first throttle's position.

13. The system of claim 12, wherein the first throttle is upstream of the venturi.

14. The system of claim 12, wherein the first throttle is downstream of the venturi.

15. The system of claim 12, wherein the fuel vapor purge system is coupled to the inlet of the venturi via a fuel vapor purging conduit, and wherein the fuel vapor purging conduit includes a purge valve disposed therein.

16. The system of claim 12, wherein the engine system is part of a hybrid electric powertrain.

17. The system of claim 12, wherein the controller further includes instructions executable to operate an engine of the engine system with stop-start to reduce idle time.

18. The system of claim 12, wherein the controller further includes instructions executable to operate an engine of the engine system with one or more of cylinder deactivation, variable camshaft timing, variable valve lift, turbocharging, or supercharging.

* * * * *